United States Patent Office 2,731,488
Patented Jan. 17, 1956

2,731,488
PRODUCTION OF ALIPHATIC NITRILES FROM IMINES

Benjamin Thompson, Kingsport, Tenn., assignor to Eastman Kodak Company, Rochester, N. Y., a corporation of New Jersey No Drawing. Application January 16, 1952,
Serial No. 266,779

5 Claims. (Cl. 260—465.1)

The present invention relates to the synthesis of nitriles from imines. More specifically, the invention is concerned with the catalytic vapor phase reaction of polyalkyl imines or N-alkenyl alkylidenimines, particularly N-alkenylalkylidenimines, with ammonia in the presence of catalysts to form a plurality of nitrile molecules per molecule of imine.

Nitriles previously have been prepared from secondary amines by pyrolysis procedures in which olefins are produced as by-products:

$$(RCH_2CH_2)_2NH \rightarrow RCH_2-CN + RCH=CH_2 + H_2$$

This process, in which theoretically one molecule of nitrile is formed for each molecule of secondary amine employed, is disclosed by Mowry, Chem. Rev., 42,249 (April 1948). Mowry also discloses that the practical results of the amine pyrolysis reaction may be improved by the addition of ammonia whereby the yield of nitrile is increased to more nearly approach the theoretical production of one molecule of nitrile per molecule of secondary amine.

It also has been postulated for some time that an alkylidenimine is formed as an intermediate product in certain processes for the preparation of nitriles from aldehydes. However, so far as is known to me, neither have the intermediate aldimines ever been isolated nor have nitriles ever been prepared from N-substituted imines before the invention of the presently disclosed process.

I have found that imines, particularly N-substituted imines are useful for the preparation of nitriles by means of a catalytic vapor phase reaction in the presence of ammonia.

Accordingly, it is an object of the present invention to provide a new process for the preparation of nitriles. A second object is to provide for the production of nitriles from N-substituted imines. Another object comprises provision of a process wherein substantially two moles of nitrile may be formed from each mole of substituted imine employed in the reaction. A still further object of the invention is to provide a practical process for the preparation of aliphatic nitriles from imines which are easily obtainable from aldehydes, e. g. isobutyraldehyde formed by the "Oxo" process. Still another object is the provision of a novel continuous process for the production of saturated aliphatic nitriles. Another object is to provide an efficient two-step process for the synthesis of nitriles from aldehydes. Another object is the provision of a process in which a crude imine product resulting from the liquid phase reaction of aldehydes with ammonia may be employed to produce nitriles in good yield. A further object of the invention is to prepare nitriles from starting material comprising liquid polyalkyl and/or alkenyl imines.

The foregoing and other objects may be accomplished in accordance with my invention by reacting N-substituted imines with ammonia in the vapor phase in the presence of a dehydration-hydrogenation catalyst to produce two moles of saturated nitrile per mole of substituted imine in nearly quantitative yield. The reaction is exemplified by the following equation:

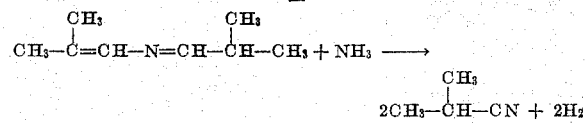

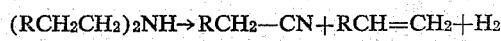

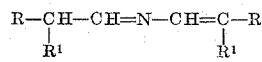

The invention contemplates particularly the employment of aliphatic N-substituted imines, especially polyalkyl and alkenyl imines, and the most advantageous embodiment is concerned with N-alkenylalkylidenimines.

In carrying out the invention, the imine may be vaporized in a stream of ammonia, or mixed therewith after vaporization. In order for complete conversion to nitriles to occur, one mole of ammonia must be used for each mole of imine fed. Normally 200 to 300 per cent excess ammonia over that required is used. The imine and ammonia vapors are passed over the catalyst at space velocities of 100 to 5000 depending on the reaction temperature employed. The product vapors are condensed and the unreacted ammonia recovered by use of condensers or scrubbers. The liquid products are then distilled either dry or as their water azeotropes. Unreacted imine is then recycled with new feed to the catalyst.

Hydrogen acceptors may be introduced into the reaction zone to facilitate the reaction between the N-alkenylalkylidenimine and ammonia. In Example No. 8 below it is shown that air may be employed. Other suitable acceptors include $CO_2$, olefins, etc.

One class of imines useful in the process of the invention is disclosed in Clark and Wilson Patent No. 2,319,848, issued May 25, 1943, wherein are described N-substituted imines, e. g. N-alkenylalkylidenimines of the formula:

$$R-\underset{R^1}{\overset{}{C}}H-CH=N-CH=\underset{R^1}{\overset{}{C}}-R$$

Another useful class of imines is that of the polyalkyl diimines of the type:

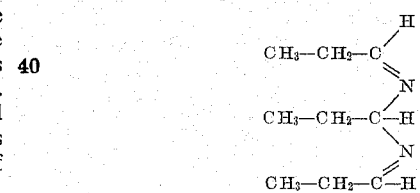

which may be isolated along with N-alkenylalkylidenimines from the products of the liquid phase reaction of a saturated aliphatic aldehyde with ammonia. In the process of the instant invention, the imines employed may contain up to 18 carbon atoms (imines prepared from aldehydes containing up to 9 carbon atoms) and R and $R^1$ therefore may be hydrogen or any alkyl groups which will provide this condition. Thus, the four R and $R^1$ groups may all be different or they may all be the same group (alkyl or hydrogen).

The imine feed may be a crude untreated product separated as a water-insoluble layer formed when an aldehyde is reacted with ammonia since most N-substituted aldimines are only slightly soluble in water. In the case of isobutyraldehyde and other α-substituted aldehydes this crude will contain about 85 per cent of N-isobutenylisobutylidenimine with the remainder the so-called tri-isobutyldiimine.

It should be noted that in view of side reactions, e. g. aldol condensations which may occur when a straight chain aldehyde such as propionaldehyde is employed as a source material of the imine, the crude resulting product may require purification to separate from the resulting mixture the by-products and reduce the amount of by-product nitriles which otherwise would be formed.

The reaction may be carried out at temperatures in the range of 200°–600° C., but it may be observed from the examples given below that an advantageous temperature is within the range of 300°–500° C. In general, it may be stated that physical reaction conditions similar to those employed in the known synthesis of nitriles directly from aldehydes and ammonia may be employed successfully.

The process may be carried out in the absence of a catalyst with some yield of nitrile, but for commercial operations a catalyst is of course quite necessary. Any one or more of a number of catalysts are suitable and of particular merit is the class of compositions known as dehydration-hydrogenation catalysts. A suitably prepared metal or metal alloy or metal oxide containing one or more of the following metals may be advantageously employed: Cu, Ag, Zn, Co, Cr, Mn, Mg, Th, Al, Si, Sn, Na, K, Ca, Mo, V, W, Ni, etc. Preferably, the catalyst is reduced at moderate temperatures in an atmosphere of hydrogen or aqueous alcohol before use. As will be noted from the examples given below, catalysts comprising copper-zinc and silver-zinc compositions, have proved eminently successful.

The ammonia may be introduced into the reaction in any suitable form or manner. A satisfactory procedure involves contacting liquid imine with heated ammonia, thereby vaporizing the imine, and drawing off for passage to the reaction zone a mixture of ammonia and imine vapors. For optimum results, the ammonia should be present at least in an amount equivalent to 1 mole per mole of imine, and the use of an excess of ammonia, particularly a quantity amounting to 2 to 4 moles per mole of imine has proved advantageous. It should be noted however, that some conversion of N-alkenylalkylidenimines to nitriles may be obtained even in the absence of ammonia if the imine is subjected to an elevated temperature of for instance 350° C. in the presence of a catalyst such as copper-zinc.

A space velocity of 100 or less to 5000 or more at a corresponding temperature of 200°–600° C. has been found suitable, but as will be evident from other portions of the present specification, operations most satisfactorily are conducted at velocities in the range of 300–450.

The invention in its preferred embodiments is illustrated in the following examples:

*Example No. 1.*—One mole of N-isobutenyl isobutylidenimine, $C_8H_{15}N$, mol. wt. 125, was vaporized and mixed with four moles of ammonia and passed at a space velocity of 330 over a copper-zinc catalyst at 350° C. The copper-zinc catalyst contained 33 per cent copper. It was prepared by co-precipitation of the oxalates; decomposition of the oxalates to the mixed oxides; and reduction to the metals at 300° C. using 5 per cent aqueous methanol. The products were condensed and the off-gas scrubbed to recover ammonia and remaining product. The scrubber water was extracted with chloroform. The solvent was combined with the organic product layer and distilled. An eighty-three per cent conversion, 1.66 moles of isobutyronitrile, was obtained and 11.2 per cent of the imine was recovered. Thus a 93 per cent ultimate yield of nitrile was produced.

*Example No. 2.*—Isobutyraldehyde was slowly mixed with equal moles of 14 per cent ammonium hydroxide. The crude imine separated as an upper layer. It was decanted off and used as feed under similar conditions to those employed in Example No. 1. High yields of isobutyronitrile were again obtained. Recovered ammonia was flashed from the scrubber water. Part of it was fed back into the solution used to prepare the imine and the remainder recycled over the catalyst. The unreacted imine, recovered as distillation heel, was combined with imine feed and recycled over the catalyst.

*Example No. 3.*—The imine was prepared by passing anhydrous ammonia into the aldehyde. An aqueous layer soon separated as the imine was formed. The imine was either distilled to separate pure N-isobutenyl isobutyraldimine for use as feed or the crude imine was passed over catalyst under conditions similar to that employed in Example No. 1.

*Example No. 4.*—Isovaleraldehyde was converted to N-isopentenylpentylidenimine and employed as described above to give high yields of isovaleronitrile.

*Example No. 5.*—2-ethyl hexanaldehyde was converted to the imine and used as described above to produce 2-ethyl hexanonitrile.

*Example No. 6.*—A silver-zinc catalyst was prepared and used in the examples described above. Eighty to ninety-five per cent yields of nitriles were obtained at 350–450° C. reaction temperatures.

*Example No. 7.*—Propionaldehyde was treated with ammonia at 10° C. and then warmed to 75° C. to form a separate crude imine layer. This was fed with ammonia over a copper-zinc catalyst as above to produce propionitrile, 2-methyl pentenonitrile and 2-methyl pentanonitrile.

*Example No. 8.*—Crude imine was prepared according to Example No. 2. It was vaporized, mixed with excess ammonia, preheated to 275° C. and mixed with one-half mole of air per mole of isobutyraldehyde used to prepare the imine just prior to contact with a 30 per cent silver—70 per cent zinc catalyst at 400° C. The total space velocity used was 400. Fractionation of products as their water azeotropes isolated isobutyronitrile equivalent to an 83 per cent conversion based upon the isobutyraldehyde content of the crude imine feed.

*Example No. 9.*—N-isobutenyl isobutylidenimine was vaporized and passed over an active copper-zinc catalyst at 350° C. and a space velocity of 86 in the absence of ammonia. Separation and identification of the effluents showed that 4% isobutyronitrile had been formed while 67% of the imine was recovered unchanged.

*Example No. 10.*—Vaporized N-isobutenyl isobutylidenimine was passed over a copper-zinc catalyst at 350° C. and a space velocity of 320 in admixture with ammonia vapors in an amount in excess of 1 mole per mole of the imine. Conversion to isobutyronitrile was nearly complete, only 19% of the imine being recovered and 77% of it being converted to isobutyronitrile for a 95% yield.

I claim:

1. Method for the preparation of a nitrile comprising the steps of vaporizing an unsaturated secondary imine, reacting the thus vaporized imine with an amount of gaseous ammonia, in excess of the ratio of one mole of ammonia per mole of the imine, over a dehydration-hydrogenation catalyst selected from the group consisting of metals, metal oxides and metal alloys at a temperature in the range of about 200°–600° C. and a space velocity in the range of about 100–5000, and recovering nitrile formed by the reaction in the ratio of approximately two moles of nitrile per mole of imine employed.

2. A method as defined in claim 1 wherein the imine is an N-alkenylalkylidenimine.

3. A method as defined in claim 2 wherein the N-alkenylalkylidenimine contains 6 to 20 carbon atoms.

4. A method as defined in claim 3 wherein the imine is N-isobutenylisobutylidenimine and the nitrile recovered is isobutyronitrile.

5. A method as defined in claim 3 wherein the imine is N-isopentenylpentylidenimine.

References Cited in the file of this patent

UNITED STATES PATENTS

| Number | Name | Date |
|---|---|---|
| 2,319,848 | Clark et al. | May 25, 1943 |
| 2,388,218 | Olin | Oct. 30, 1945 |
| 2,421,937 | Haury | June 10, 1947 |
| 2,443,420 | Gresham | June 15, 1948 |
| 2,498,419 | Haury | Feb. 21, 1950 |
| 2,500,256 | Mahan | Mar. 14, 1950 |
| 2,525,818 | Mahan | Oct. 17, 1950 |
| 2,582,128 | Hurwitz | Jan. 8, 1952 |

OTHER REFERENCES

Mowry: Chem. Reviews, vol. 42, pgs. 249–50 (1948).